(12) United States Patent
Chao et al.

(10) Patent No.: US 8,394,550 B2
(45) Date of Patent: Mar. 12, 2013

(54) NANO-PATTERNED ELECTROLYTES IN SOLID OXIDE FUEL CELLS

(75) Inventors: Cheng-Chieh Chao, Stanford, CA (US); Yi Cui, Stanford, CA (US); Ching-Mei Hsu, Stanford, CA (US); Young Beom Kim, Stanford, CA (US); Friedrich B. Prinz, Woodside, CA (US)

(73) Assignees: The Board of Trustees of the Leland Stanford Junior University, Palo Alto, CA (US); Honda Motor Co., Ltd, Tokyo (JP)

( * ) Notice: Subject to any disclaimer, the term of this patent is extended or adjusted under 35 U.S.C. 154(b) by 266 days.

(21) Appl. No.: 12/807,777

(22) Filed: Sep. 14, 2010

(65) Prior Publication Data

US 2011/0076589 A1    Mar. 31, 2011

Related U.S. Application Data

(60) Provisional application No. 61/277,980, filed on Sep. 30, 2009.

(51) Int. Cl.
*H01M 8/10* (2006.01)

(52) U.S. Cl. .................. 429/480; 429/523; 429/534

(58) Field of Classification Search .................. 429/480, 429/523, 534
See application file for complete search history.

(56) References Cited

U.S. PATENT DOCUMENTS

| 2006/0008696 | A1* | 1/2006 | Cha et al. ................ 429/38 |
| 2009/0011204 | A1 | 1/2009 | Wang et al. |
| 2009/0194160 | A1 | 8/2009 | Chin et al. |

* cited by examiner

*Primary Examiner* — Jane Rhee
(74) *Attorney, Agent, or Firm* — Lumen Patent Firm

(57) ABSTRACT

A nano-patterned membrane electrode assembly (MEA) is provided, which includes an electrolyte membrane layer having a three-dimensional close-packed array of hexagonal-pyramids, a first porous electrode layer, disposed on a top surface of the electrolyte membrane layer that conforms to a top surface-shape of the three-dimensional close-packed array of hexagonal-pyramids, and a second porous electrode layer disposed on a bottom surface of said electrolyte membrane layer that conforms to a bottom surface-shape of the three-dimensional close-packed array of hexagonal-pyramids, where a freestanding nano-patterned MEA is provided.

13 Claims, 5 Drawing Sheets

# NANO-PATTERNED ELECTROLYTES IN SOLID OXIDE FUEL CELLS

CROSS-REFERENCE TO RELATED APPLICATIONS

This application claims priority from U.S. Provisional Patent Application 61/277,980 filed Sep. 30, 2009, which is incorporated herein by reference.

FIELD OF THE INVENTION

The invention generally relates to fuel cells. More specifically, the invention relates to nano-patterned electrolyte membrane assemblies having 3-dimensional close-packed hexagonal pyramid arrays.

BACKGROUND OF THE INVENTION

A Solid oxide fuel cell (SOFC) uses a solid oxide as an electrolyte where oxygen ions can pass through. The SOFC operates by reduction of oxygen gas at positive electrode to transport oxygen ions through the electrolyte membrane, and by oxidation of a fuel gas at the negative electrode. Typical electrolytes used include stabilized zirconia and doped ceria, like yttria stabilized zirconia (YSZ) and gadolinia doped ceria (GDC). Typical electrodes can be metal catalyst, like Pt, Ag, Ni, mixed ionic and electronic conducting oxides, as well as catalyst/electrolyte composites. The layered structure of the electrodes and the electrolyte are referred to as the membrane electrolyte assembly (MEA).

SOFC's are limited by low ionic conductivity and low catalytic activity, necessitating the SOFC to be operated at temperatures in excess of 700 degrees Celsius.

In one aspect, the power density of SOFC is determined by ohmic loss across the MEA stemming from slow ionic transport through electrolyte and concentration loss caused by limited gas interaction at the electrode reaction sites.

Accordingly, there is a need to develop an low-cost and easy to fabricate MEA structure, which reduces ohmic loss for better performances at a certain operating temperatures by increasing the electrode reaction surface area and reducing the thickness of the electrolyte to overcome the current limitations in the art.

SUMMARY OF THE INVENTION

To overcome the shortcomings in the art, a nano-patterned membrane electrode assembly (MEA) is provided, which includes an electrolyte membrane layer having a three-dimensional close-packed array of hexagonal-pyramids, a first porous electrode layer, disposed on a top surface of the electrolyte membrane layer that conforms to a top surface-shape of the three-dimensional close-packed array of hexagonal-pyramids, and a second porous electrode layer disposed on a bottom surface of said electrolyte membrane layer that conforms to a bottom surface-shape of the three-dimensional close-packed array of hexagonal-pyramids, where a free-standing nano-patterned MEA is provided.

In one aspect of the invention, the electrolyte membrane layer has a thickness in a range of 30 nm to 150 nm.

In another aspect of the invention, the first porous electrode layer and the second porous electrode layer each have a thickness in a range of 30 nm to 150 nm.

In a further aspect of the invention, the nano-patterned MEA has a thickness in a range of 90 nm to 450 nm.

According to another aspect of the invention, the electrolyte is made from a material that includes yttria-stabilized zirconia (YSZ), gadolinia-doped ceria (GDC), or yttria-doped ceria (YDC).

In a further aspect of the invention, the porous electrodes are made from a material that can include platinum, platinum-nickel alloy, or platinum-ruthenium alloy.

In yet another aspect of the invention, a peak-to-peak distance of the three-dimensional close-packed hexagonal-pyramids is in a range of 500 nm to 5000 nm.

According to one aspect of the invention, a height of the three-dimensional close-packed hexagonal-pyramids between a top plane and a bottom plane of the nano-patterned MEA is in a range of 500 nm to 5000 nm.

In another aspect of the invention, a pattern of the three-dimensional close-packed hexagonal-pyramids are provided by nanosphere lithography.

In a further aspect of the invention, the nano-patterned MEA of claim 1, wherein the three-dimensional close-packed pattern includes a close-packed pattern provided using a Langmuir-Blodgett method.

In yet another aspect of the invention, the electrolyte membrane layer is provided using atomic layer deposition, chemical vapor deposition, or pulse laser deposition.

According to another aspect of the invention, the porous electrodes are provided using sputtering, evaporation, or atomic layer deposition.

In one aspect of the invention, the nano-patterned MEA is disposed in a solid oxide fuel cell.

DETAILED DESCRIPTION

Solid oxide fuel cells are devices that convert chemical energy to electrical energy. These fuel cells include an anode, a cathode and a solid electrolyte between the cathode and the anode. The present invention provides an enhanced the reaction area of solid oxide fuel cell (SOFC) electrolytes in a membrane electrode assembly (MEA). The current invention further provides a method of fabricating the MEA using nanosphere lithography. In one example, a nano-scale close-packed three-dimensional pattern is created on a silicon substrate using nano-sphere lithography (NSL). An electrolyte is then deposited on the patterned substrate using Atomic layer deposition (ALD), according to one embodiment of the invention. The electrolyte may also be fabricated using chemical vapor deposition (CVD) instead of ALD.

The patterned electrolytes demonstrate a larger reaction area when compared to conventional electrolytes without patterns. As a result, a higher power density per unit area is achieved.

In one aspect, the invention provides a significantly reduced number of photolithography fabrication steps required to create the three-dimensional MEA patterns, where an increase of reaction area is provided.

Figure 1:
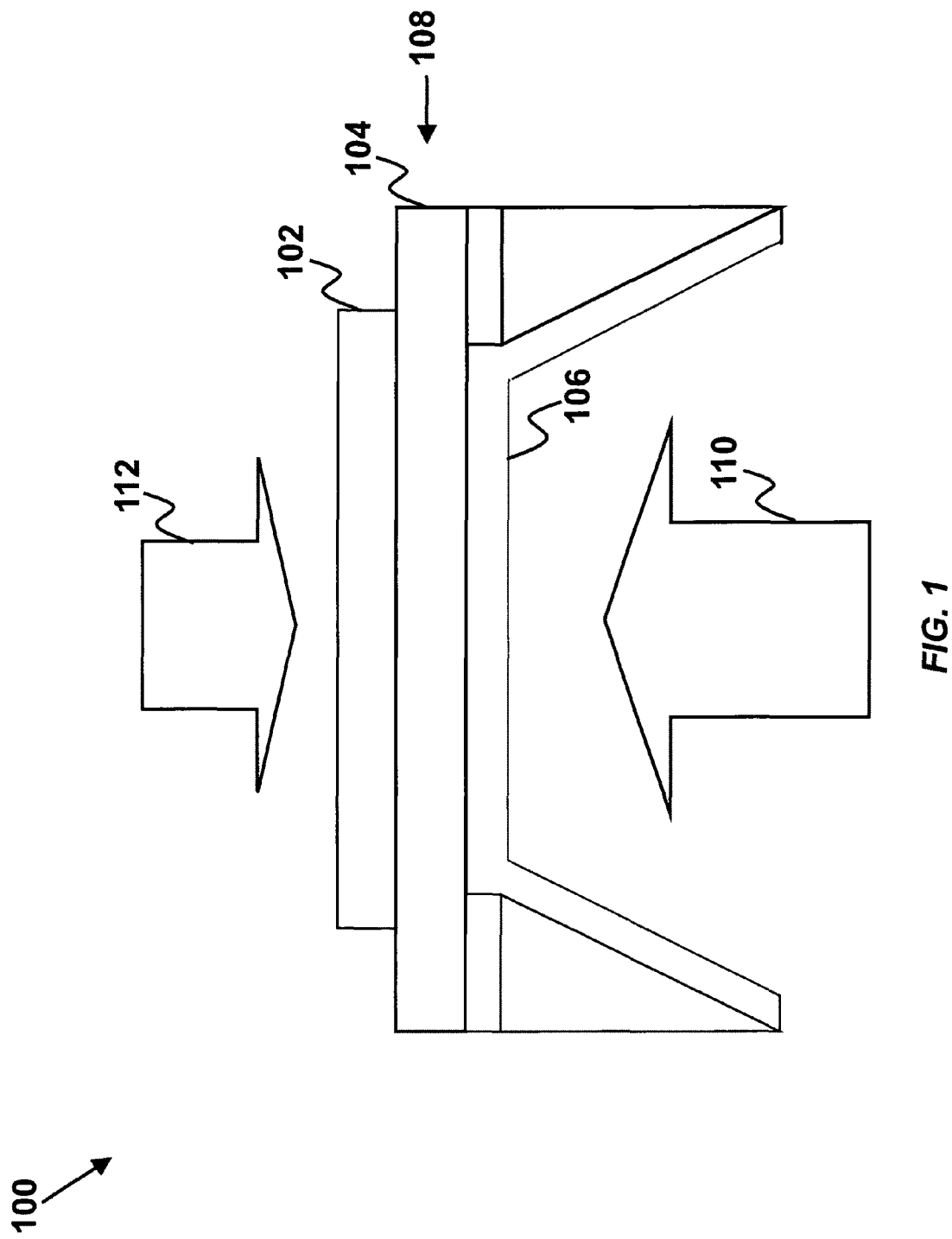
FIG. 1 shows a schematic drawing of a fuel cell according to one embodiment of the current invention.

Referring now to the drawings, FIG. 1 shows a schematic drawing of a fuel cell according to one embodiment of the current invention, where shown is a porous cathode layer 102, where the porous cathode layer 102 may be made or platinum (Pt) or any other suitable material, a nano-patterned electrolyte layer 104 that can be fabricated using atomic layer deposition (ALD) and can include ALD Pt capping. Shown below the nano-patterned electrolyte layer 104 is a porous anode layer 106, which may be made or platinum (Pt) or any other suitable material. The porous cathode layer 102, the nano-patterned electrolyte layer 104 and the porous anode layer 106 form a nano-patterned MEA 108. In operation, hydrogen gas 110 is provided to the porous anode layer 106, where the hydrogen is catalyzed to provide protons for passing through the electrolyte layer 104 and electrons from the catalyzed hydrogen provide electrical energy. Oxygen containing air 112 is provided to the porous cathode layer 102, which acts as a catalyst to react with the protons and output water.

Figure 2:
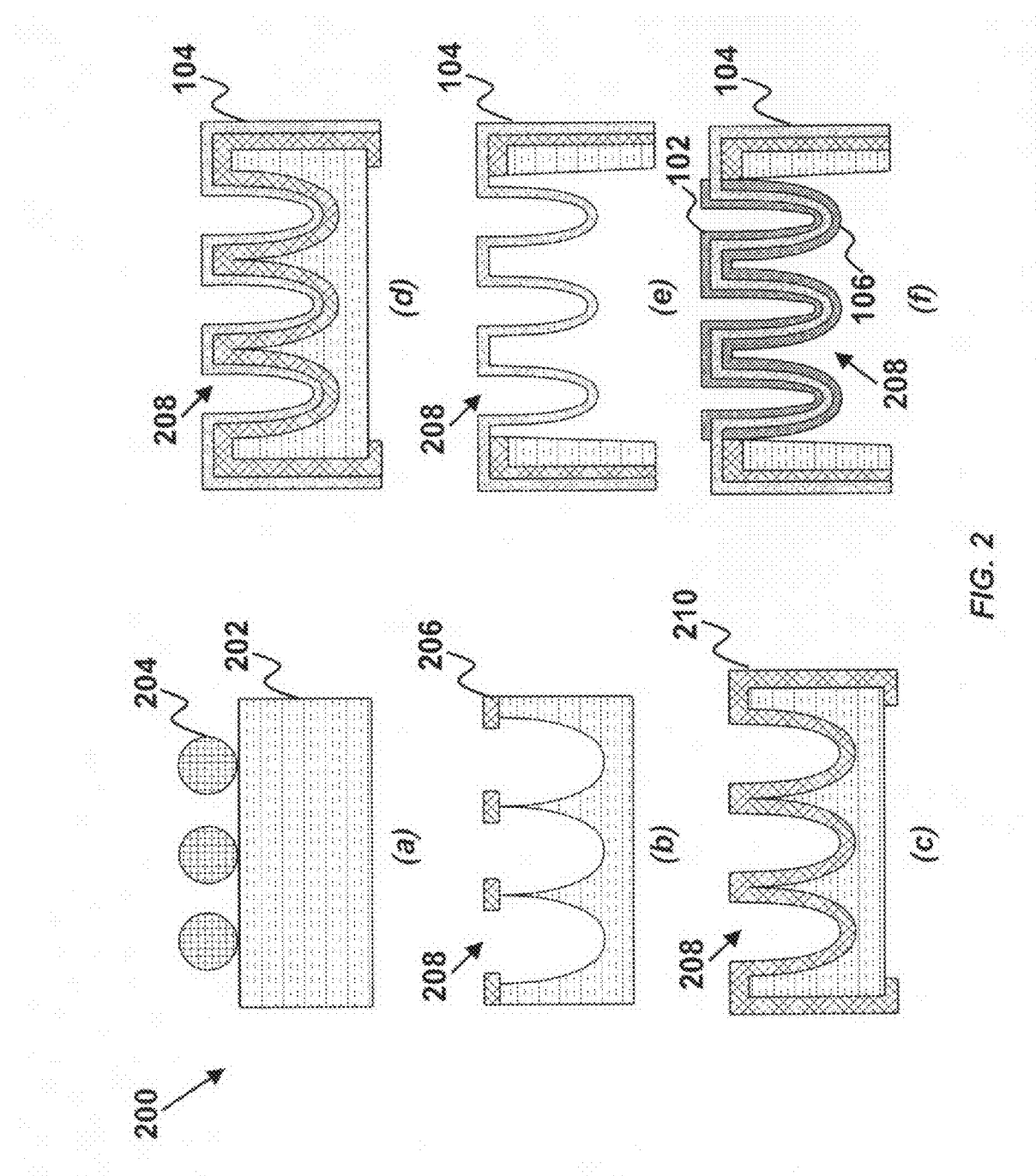
FIGS. 2a-2f show the steps for fabricating the MEA according to one embodiment of the current invention.

FIGS. 2a-2f show the three-dimensional close-packed array of hexagonal-pyramid MEA fabrication steps 200, according to one embodiment of the current invention, where shown in FIG. 2a is the step of coating a substrate 202 with close-packed nano particles 204 by a Langmuir-Blodgett Method, which can be reduced to a desired nano particle size by dry etching. FIG. 2b shows the step of depositing a metal mask 206 and removing nano particles 204, where dry etching the substrate 202 is used to create nano-patterns 208 according to the close-packed pattern.

FIG. 2c shows the step of removing metal mask 206 by wet etching and coating patterned substrate 202 with a silicon nitride buffer layer 210 by, for example, CVD, where a backside of the substrate 202 is disposed in an open nitride-free state using photo-lithography.

FIG. 2d shows the step of coating an electrolyte layer 104 on the silicon nitride buffer layer 210, using atomic layer deposition, chemical vapor deposition, or pulse laser deposition for example, where the electrolyte layer 104 can be made from yttria-stabilized zirconia (YSZ), gadolinia-doped ceria (GDC), or yttria-doped ceria (YDC).

FIG. 2e shows the step of removing the silicon substrate 202 using KOH wet etching, or any suitable etching, and the silicon nitride buffer layer 210 us removed by dry etching, or any suitable etching, where a free-standing, three-dimensional nano-patterned electrolyte layer 104 is then provided.

FIG. 2f shows the step of coating porous electrodes 102/106, for example platinum, platinum-nickel alloy, or platinum-ruthenium alloy, by sputtering, evaporation, atomic layer deposition, or any suitable deposition method, where a free stand free-standing, three-dimensional nano-patterned MEA 108 is provided, which may be disposed in a solid oxide fuel cell 100.

Figure 3:
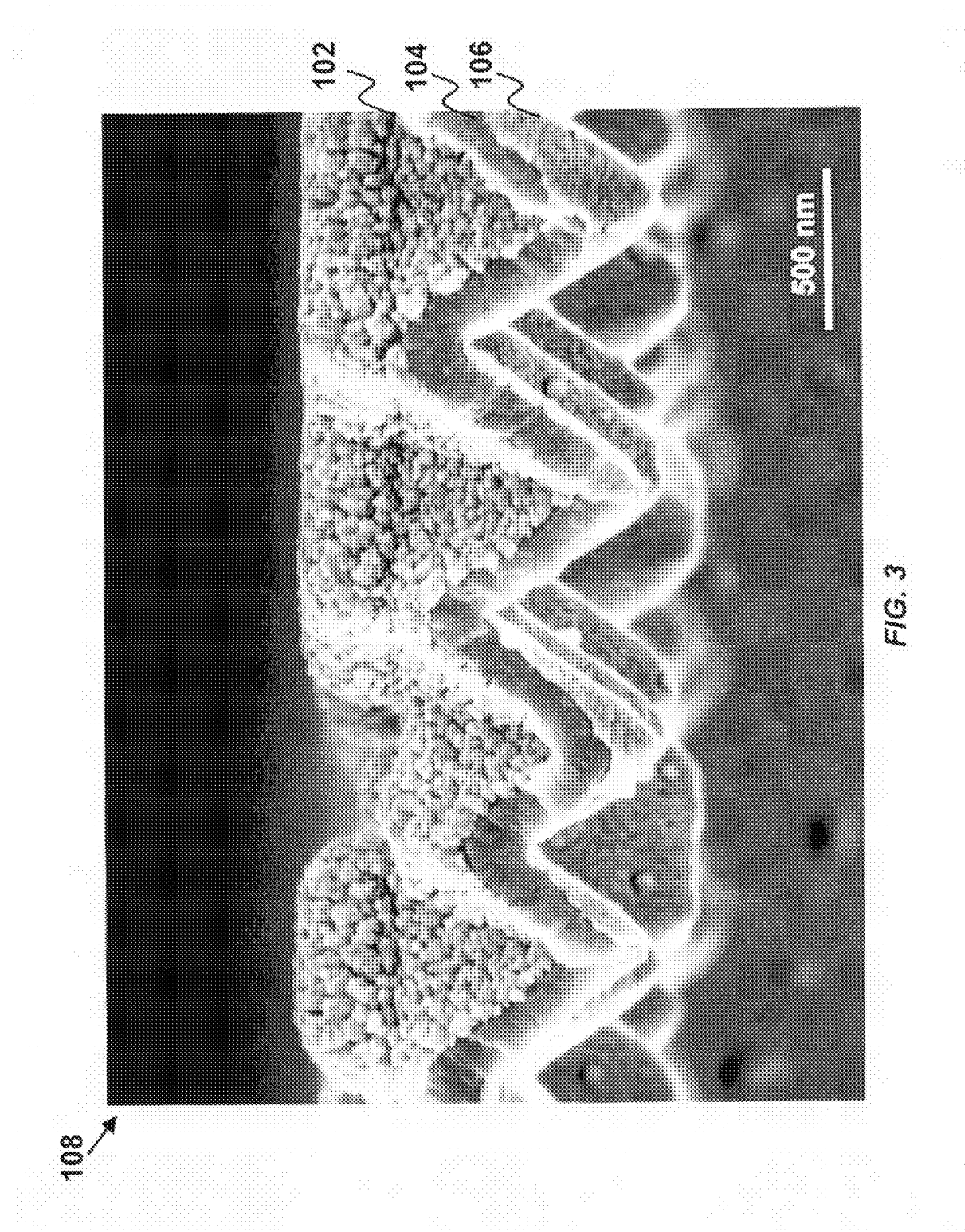
FIGS. 3-4 show scanning electron microscope images of the MEA according to one embodiment of the current invention.
Figure 4:
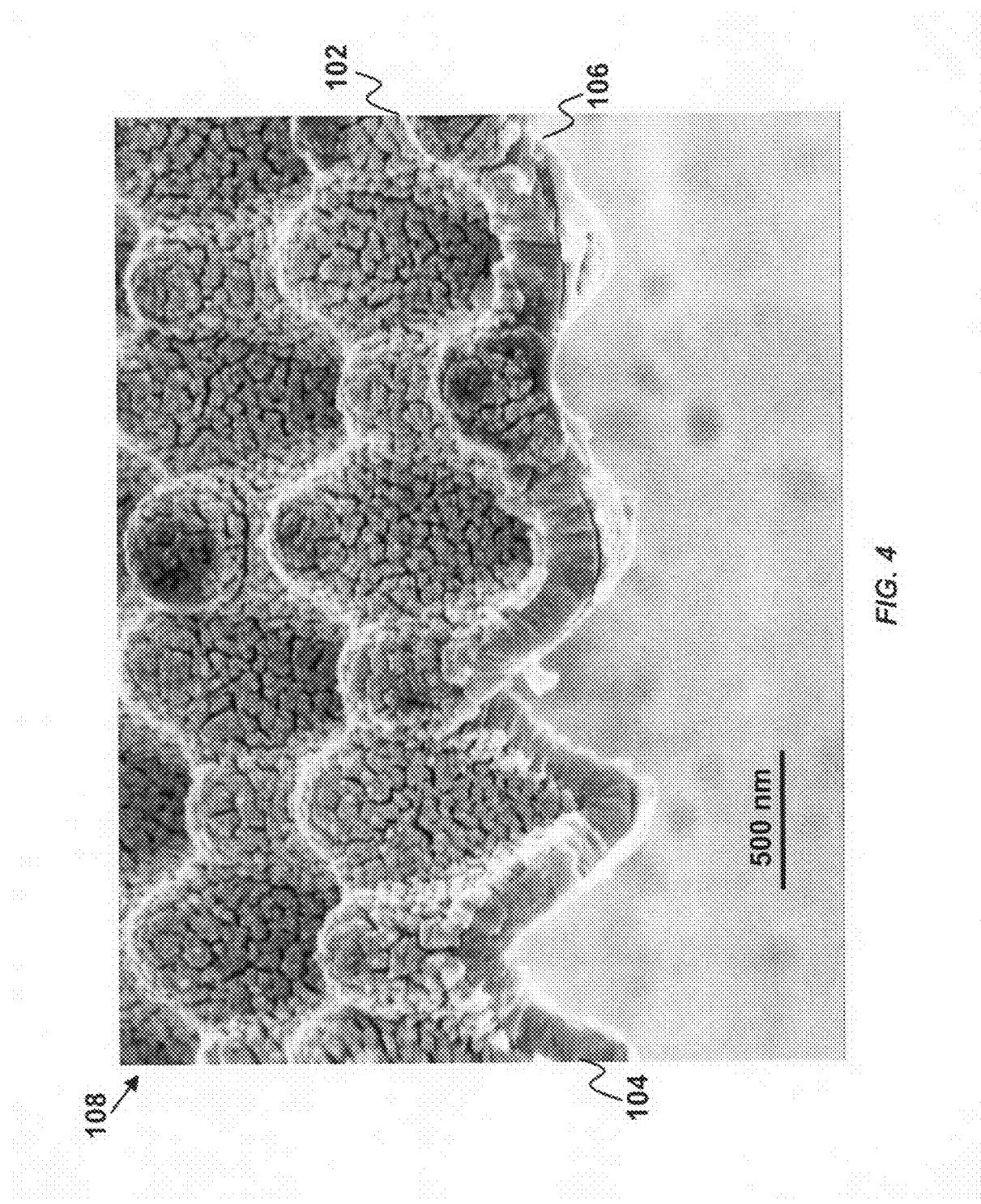

FIGS. 3-4 show scanning electron microscope images of the MEA 108. According to one embodiment, the electrolyte membrane layer 108 includes a three-dimensional close-packed array of hexagonal-pyramids, where the porous cathode layer 102 is disposed on a top surface of the electrolyte membrane layer 104 and conforms to a top surface-shape of the three-dimensional close-packed array of hexagonal-pyramids, and a second porous electrode layer 106 disposed on a bottom surface of said electrolyte membrane layer 104 that conforms to a bottom surface-shape of the three-dimensional close-packed array of hexagonal-pyramids, where a free-standing nano-patterned MEA 108 is provided. In one aspect of the invention, the electrolyte membrane layer 104 has a thickness in a range of 30 nm to 150 nm. In another aspect of the invention, the first porous electrode layer 102 and the second porous electrode layer 106 each have a thickness in a range of 30 nm to 150 nm. In a further aspect of the invention, the nano-patterned MEA 108 has a thickness in a range of 90 nm to 450 nm.

Figure 5:
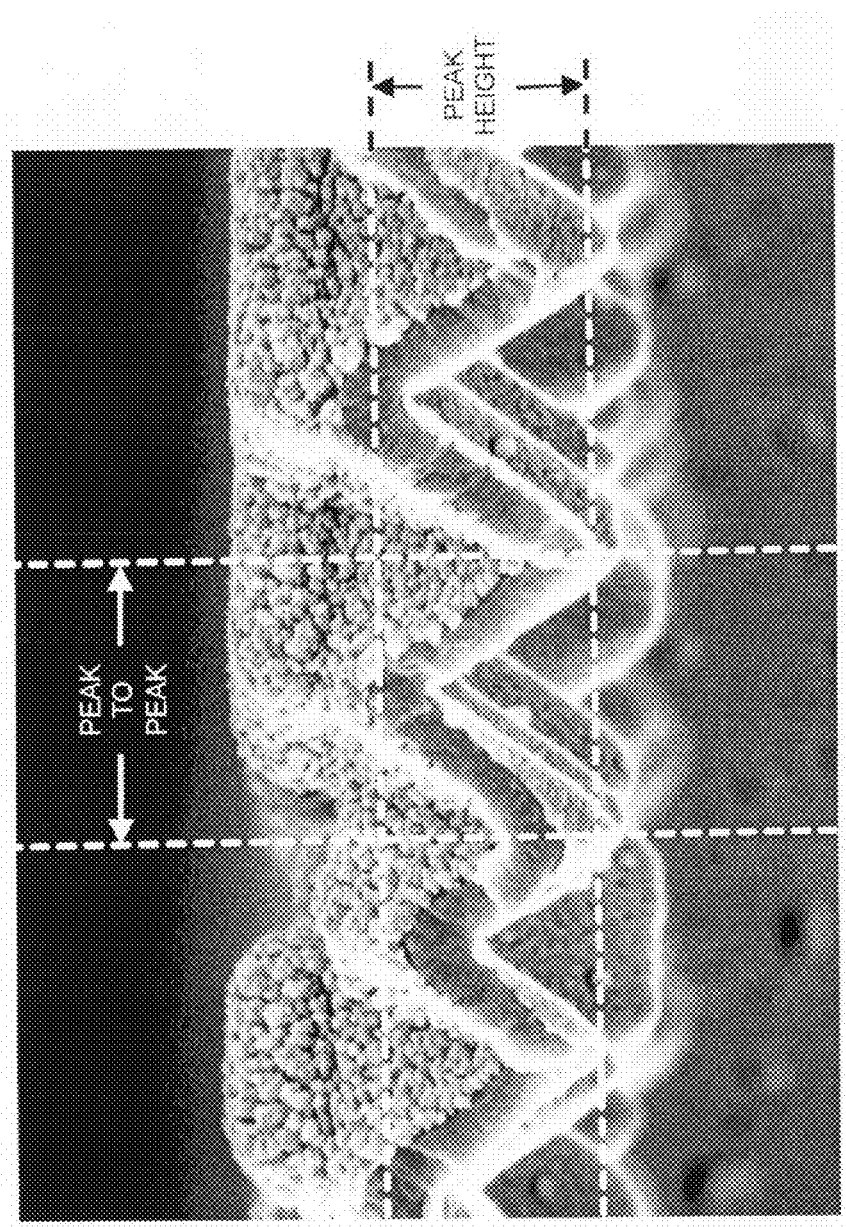
FIG. 5 shows a scanning electron microscope image of the MEA with dashed lines showing peak-to-peak distances and peak heights, according to one embodiment of the current invention.

FIG. 5 shows a scanning electron microscope image of the MEA with dashed lines showing peak-to-peak distances and peak heights. In FIG. 5, a peak-to-peak distance of the three-dimensional close-packed hexagonal-pyramids of the nano-patterned MEA 108 is shown by a separation the two parallel, vertical dashed lines. According to the invention, the peak-to-peak distance is in a range of 500 nm to 5000 nm. Further shown, is the height of the three-dimensional close-packed hexagonal-pyramids of the nano-patterned MEA 108, where the height of the hexagonal-pyramids is in a range of 500 nm to 5000 nm.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed:

1. A nano-patterned membrane electrode assembly (MEA), comprising:
   a. an electrolyte membrane layer, wherein said electrolyte membrane layer comprises a three-dimensional close-packed array of hexagonal-pyramids;
   b. a first porous electrode layer, wherein said first porous electrode layer is disposed on a top surface of said electrolyte membrane layer and conforms to a top surface-shape of said three-dimensional close-packed array of hexagonal-pyramids; and
   c. a second porous electrode layer, wherein said second porous electrode layer is disposed on a bottom surface of said electrolyte membrane layer and conforms to a bottom surface-shape of said three-dimensional close-packed array of hexagonal-pyramids, wherein a free-standing nano-patterned MEA is provided.

2. The nano-patterned MEA of claim 1, wherein said electrolyte membrane layer has a thickness in a range of 30 nm to 150 nm.

3. The nano-patterned MEA of claim 1, wherein said first porous electrode layer and said second porous electrode layer each have a thickness in a range of 30 nm to 150 nm.

4. The nano-patterned MEA of claim 1, wherein said nano-patterned MEA has a thickness in a range of 90 nm to 450 nm.

5. The nano-patterned MEA of claim 1, wherein said electrolyte is made from a material selected from the group consisting of yttria-stabilized zirconia (YSZ), gadolinia-doped ceria (GDC), and yttria-doped ceria (YDC).

6. The nano-patterned MEA of claim 1, wherein said porous electrodes are made from a material selected from the group consisting of platinum, platinum-nickel alloy, and platinum-ruthenium alloy.

7. The nano-patterned MEA of claim 1, wherein a peak-to-peak distance of said three-dimensional close-packed hexagonal-pyramids is in a range of 500 nm to 5000 nm.

8. The nano-patterned MEA of claim 1, wherein a height of said three-dimensional close-packed hexagonal-pyramids between a top plane and a bottom plane of said nano-patterned MEA is in a range of 500 nm to 5000 nm.

9. The nano-patterned MEA of claim 1, wherein a pattern of said three-dimensional close-packed array of hexagonal-pyramids is provided by nanosphere lithography.

10. The nano-patterned MEA of claim 1, wherein said three-dimensional close-packed array of hexagonal-pyramids comprises a close-packed pattern provided using a Langmuir-Blodgett method.

11. The nano-patterned MEA of claim 1, wherein said electrolyte membrane layer is provided using atomic layer deposition, chemical vapor deposition, and pulse laser deposition.

12. The nano-patterned MEA of claim 1, wherein said porous electrodes are provided using sputtering, evaporation, and atomic layer deposition.

13. The nano-patterned MEA of claim 1, wherein said nano-patterned MEA is disposed in a solid oxide fuel cell.

* * * * *